United States Patent
Sui et al.

(10) Patent No.: US 11,928,082 B1
(45) Date of Patent: Mar. 12, 2024

(54) CONTAINER IMAGE FILE SYSTEM PERFORMANCE ENHANCEMENT

(71) Applicant: International Business Machines Corporation, Armonk, NY (US)

(72) Inventors: Guang Han Sui, Beijing (CN); Jin Chi He, Xi'an (CN); Peng Hui Jiang, Beijing (CN); Gang Tang, Nanjing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/056,864

(22) Filed: Nov. 18, 2022

(51) Int. Cl.
*G06F 16/13* (2019.01)
*G06F 16/17* (2019.01)
*G06F 16/176* (2019.01)

(52) U.S. Cl.
CPC .......... *G06F 16/1734* (2019.01); *G06F 16/13* (2019.01); *G06F 16/176* (2019.01)

(58) Field of Classification Search
CPC ..... G06F 16/1734; G06F 16/13; G06F 16/176
See application file for complete search history.

(56) References Cited

U.S. PATENT DOCUMENTS

| | | | |
|---|---|---|---|
| 11,182,193 B2 | 11/2021 | Skourtis et al. | |
| 2018/0173524 A1* | 6/2018 | Azagury | G06F 9/30181 |
| 2018/0275987 A1 | 9/2018 | Vandeputte | |
| 2021/0124773 A1 | 4/2021 | Eder et al. | |
| 2021/0240671 A1* | 8/2021 | Fong | H04L 67/06 |
| 2023/0066058 A1* | 3/2023 | Yadav | G09B 19/0053 |

OTHER PUBLICATIONS

Sun et al., "Baoverlay: A Block-Accessible Overlay File System for Fast and Efficient Container Storage," 2020 ACM Symposium on Cloud Computing (SoCC '20), Oct. 19-21, 2020, Virtual Event, 15 pages.

"File sharing in docker host and container-v and volume," Katastros, copyright 2022, accessed Aug. 22, 2022, 6 pages. https://blog.katastros.com/a?ID=00650-67101d5d-32b0-4888-a393-e6053d983dbc.

Zheng et al., "Wharf: Sharing Docker Images in a Distributed File System," 2018 ACM Symposium on Cloud Computing (SoCC'18), Oct. 11-13, 2018, Carlsbad, California, 12 pages.

* cited by examiner

*Primary Examiner* — Etienne P Leroux
(74) *Attorney, Agent, or Firm* — Yee & Associates, P.C.

(57) ABSTRACT

File system performance enhancement is provided. Information related to a container of the computer accessing a file in a layer of a file system of an image corresponding to the container is recorded to form recorded file system layer access information. The recorded file system layer access information is shared with another file system of a container image corresponding to a different container on the computer. The container image is a same image as the image corresponding to the container that accessed the file to perform an operation associated with a cloud application.

20 Claims, 9 Drawing Sheets

CONTAINER IMAGE FILE SYSTEM PERFORMANCE ENHANCEMENT

BACKGROUND

1. Field

The disclosure relates generally to file systems and more specifically to enhancing performance of file systems in container images corresponding to containers running cloud applications on computers by sharing file system layer access information between different file systems corresponding to a same container image.

2. Description of the Related Art

A file system is a data structure that an operating system uses to control how data is stored and retrieved. Without a file system, data placed in a storage medium (e.g., storage disk) would be one large body of data with no way to tell where one piece of data stopped and the next began, or where any piece of data was located when it was time to retrieve it. By separating the data into groups and giving each group a name, the data is easily isolated and identified. Each group of data is called a file. The structure and rules used to manage the groups of data and their names is called the file system.

A container is defined as a ready-to-run software package that contains information, such as, for example, code, runtime, system libraries, default values for essential settings, and the like, needed to run a cloud application. A container's performance depends on the file system corresponding to that particular container. However, current container image file systems have performance issues.

For example, one current container image file system is an advanced multi-layered unification file system ("AUFS"). AUFS implements a union mount for file systems. In other words, AUFS layers multiple directories on a host node and presents the multiple directories as a single directory, which appears to contain their combined contents. These multiple directories are called layers in the single directory. Thus, AUFS provides a single directory for files from multiple layers. This unification process is referred to as a union mount. The union mount provides the unified view of all the layers. However, performance issues exist when there are a multitude of files and layers in the file system because access to a particular file requires a level-by-level search of the entire file system. In addition, AUFS uses a copy-on-write strategy, which yields low performance for large files.

Another type of current container image file system is an overlay file system ("OverlayFS"). OverlayFS presents a filesystem which is the result of overlaying one directory on top of another directory. OverlayFS is another type of union file system that is similar to AUFS. OverlayFS references a lower directory corresponding to a container image layer and an upper directory corresponding to a container layer. OverlayFS utilizes a unified view of the lower and upper directories in a merged directory for files corresponding to both the lower and upper directories. OverlayFS then utilizes hard links as a space-efficient way to reference data shared with lower container and image layers. However, OverlayFS creates excessive index node ("inode") consumption of the file system, which leads to inode exhaustion, causing the host node to fail. An inode is a data structure in the file system that describes a file, which includes, for example, the attributes and location (e.g., disk block location) of the file. The only way to increase the number of inodes available to the file system is to reformat the entire file system.

Yet another type of current container image file system is OverlayFS2. OverlayFS2 is similar to OverlayFS having multiple layers and inodes. Thus, OverlayFS2 has similar performance issues as OverlayFS. No solution currently exists that resolves these performance issues noted above.

SUMMARY

According to one illustrative embodiment, a computer-implemented method for file system performance enhancement is provided. A computer records information related to a container of the computer accessing a file in a layer of a file system of an image corresponding to the container to form recorded file system layer access information. The computer shares the recorded file system layer access information with another file system of a container image corresponding to a different container on the computer. The container image is a same image as the image corresponding to the container that accessed the file to perform an operation associated with a cloud application. According to other illustrative embodiments, a computer system and computer program product for file system performance enhancement are provided. As a result, by sharing file system layer access information between different file systems corresponding to a same container image, the illustrative embodiments enhance performance of the file systems in container images corresponding to containers running cloud applications.

In addition, the illustrative embodiments optionally perform an analysis of shared file system layer access information. The shared file system layer access information is related to the container previously accessing the file in the file system of the image corresponding to the container. The image corresponding to the container is a same container image as the container image corresponding to the different container. Subsequently, the illustrative embodiments determine whether a file size of the file is greater than or equal to a defined file size threshold level based on the analysis of the recorded file system layer access information. In response to determining that the file size of the file is not greater than or equal to the defined file size threshold level based on the analysis of the recorded file system layer access information, an entire content of the file is retrieved from the shared file system layer access information for the different container enabling the different container to perform an operation without accessing the file in the other file system to decrease latency and increase performance. In response to determining that the file size of the file is greater than or equal to the defined file size threshold level based on the analysis of the recorded file system layer access information, the file is preloaded into memory prior to the different container starting to enable the different container to access the file and perform an operation without having to search layers of the other file system one-by-one to locate the file to decrease latency and increase performance. Consequently, the illustrative embodiments enable the file systems to decrease latency and increase performance.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
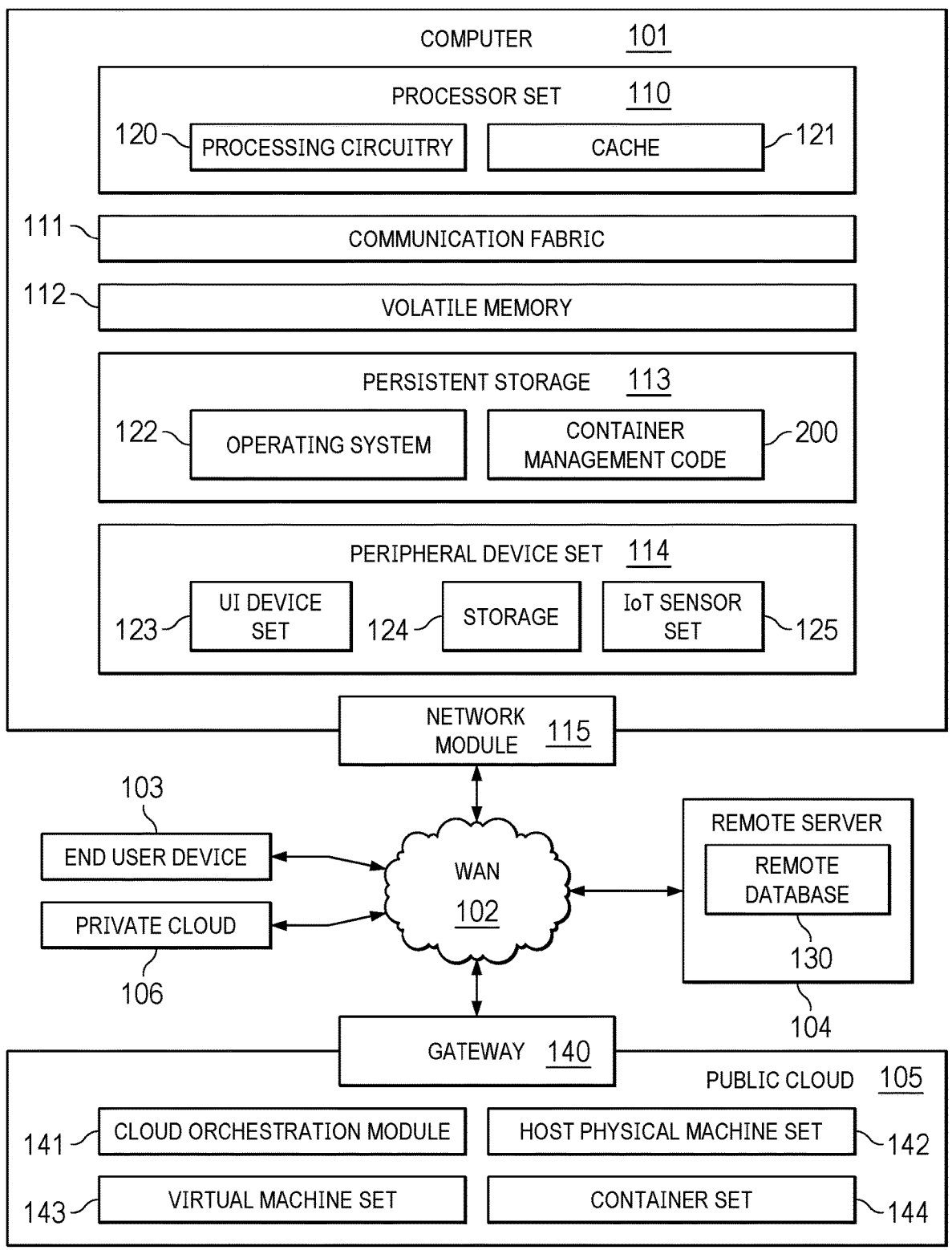
FIG. 1 is a pictorial representation of a computing environment in which illustrative embodiments may be implemented.
Figure 2:
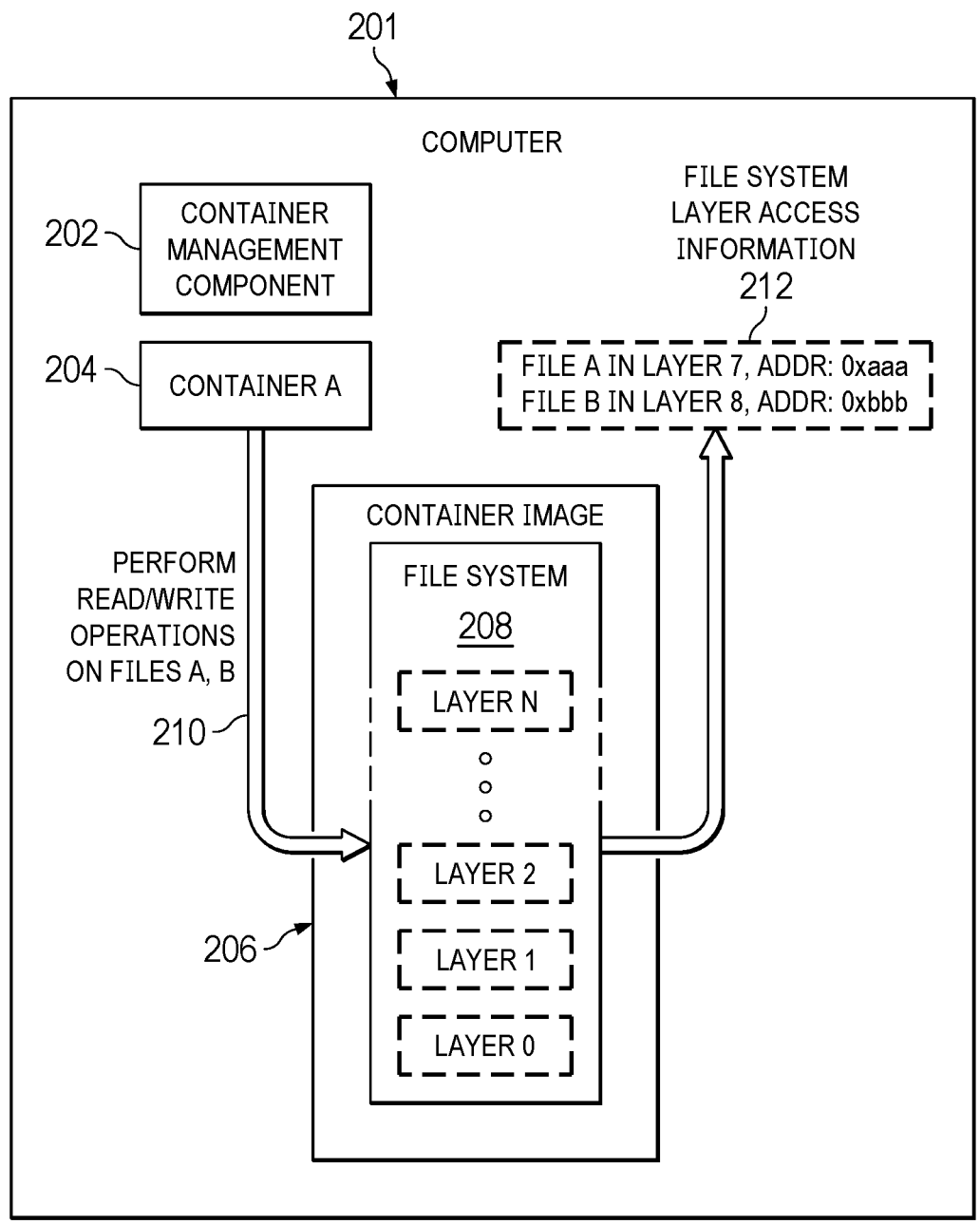
FIG. 2 is a diagram illustrating an example of a computer in accordance with an illustrative embodiment.
Figure 3:
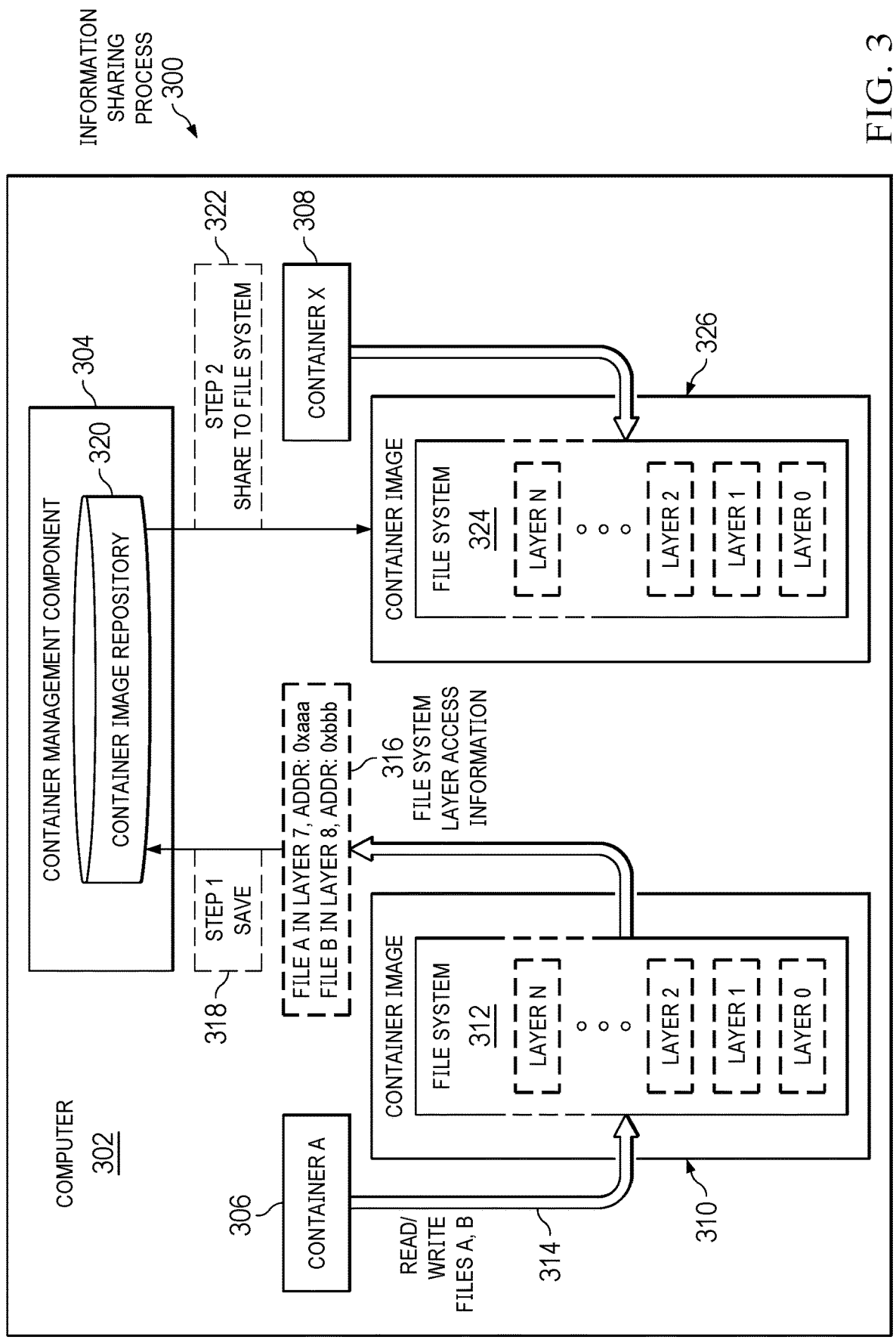
FIG. 3 is a diagram illustrating an example of an information sharing process in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as container management code 200. Container management code 200 enhances performance of file systems in container images corresponding to containers running cloud applications on computer 101 by sharing file system layer access information between file systems corresponding to a same container image.

In addition to container management code block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and container management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, mainframe computer, quantum computer, or any other form of computer or mobile device now known or to be developed in the future that is capable of running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in container management code block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The container management code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a system administrator, program developer, or the like of an entity, such as an enterprise, company, business, organization, agency, institution, or the like, that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Illustrative embodiments provide a container management component on a computer node (e.g., server computer in a cloud environment) that collects and records information related to accessing layers of a file system by a container and shares the recorded file system layer access information with other containers to increase performance of the containers (i.e., decrease file access time in the layers of the file system to increase speed of operations, such as reading and writing, on respective layers). The container management component records the file system layer access information (e.g., file address and entire file content of the accessed file or file address only when the size of the content is greater than or equal to a defined file size threshold level) whenever the container performs a read operation or a write operation on a particular layer in the file system of the container's image. As an illustrative example, the container management component records file system layer access information corresponding to the container reading "file a" and "file b", which are located in "layer 7" and "layer 8", respectively, in the file system of the container image, along with the address of file a (e.g., "0xaaa") and the address of file b (e.g., "0xbbb").

The container management component saves the recorded file system layer access information in a container image repository of the container management component. The container management component then shares the recorded file system layer access information with file systems of container images that are the same as the container image associated with the container performing the operation. The file systems of the container images receiving the shared file system layer access information can be on the same computer node as the container performing the operation or on different computer nodes. Now, when another container wants to access, for example, file b, that container does not need to search the file system layers one-by-one to locate file b. Instead, the container just reads the address of file b in the shared file system layer access information to locate file b, which increases application performance by decreasing file access time and, therefore, increases computer node performance. Moreover, if the container management component includes both the file address and the entire content of file b in the shared file system layer access information when the size of file b is less than the defined file size threshold level, then the container is able to perform an operation on the file b content without accessing the file system, which decreases latency and increases performance.

Further, illustrative embodiments enable the file system to pre-load certain files (e.g., files having a size greater than or equal to the defined file size threshold level) to memory from layers of the file system based on the shared file system layer access information, which identifies those files having a size greater than or equal to the defined file size threshold level, to avoid reading or writing operation latency. For example, a container writing to a large file that exceeds the defined file size threshold level can cause write operation latency. Consequently, illustrative embodiments have the file system pre-load those files exceeding the defined file size threshold level into memory from the layers of file system prior to the container needing the files to improve application performance. In other words, the file system pre-loads a large file needed by the container into memory before the container starts. As a result, the file needed by the container is already loaded and ready for the container, which decreases the time needed to start a read or write operation. Therefore, the operation latency associated with searching the layers of the file system one-by-one to locate and load the needed file is avoided.

The container management component also dynamically updates the file system layer access information in the container image repository as the container accesses different files to perform read or write operations on layers in the file system of the container image. For example, in response to the container accessing a different file in the file system, the container management component automatically records and saves the updated file system layer access information to the container image repository and then shares the updated file system layer access information with files systems corresponding to the same container image on the same computer node or on one or more different computer nodes. As an illustrative example, in addition to the container previously accessing file a in layer 7 at file address 0xaaa and file b in layer 8 at file address 0xbbb to perform read and write operations, the container is now also accessing "file c" in "layer 3" at file address "0xccc" to perform read and write operations. The container management component saves the updated file system layer access information to the container image repository and then shares the updated file system layer access information with files systems, which correspond to the same container image, on the same computer node or on different computer nodes.

Furthermore, the container management component collects and records file system layer access information corresponding to different application runtime workload patterns (e.g., different microservices), saves the recorded file system layer access information corresponding to the different application runtime workload patterns in the container image repository, and shares the recorded file system layer access information corresponding to application runtime workload patterns with a set of file systems corresponding to the same container image. For example, for a particular application runtime workload pattern, the needed files by a container are different from those files needed by containers for other application runtime workload patterns. In other words, different application runtime workloads perform different tasks, but utilize the same container image. To decrease memory space utilization, illustrative embodiments enable the file system to read the shared file system layer access information corresponding to a particular application runtime workload pattern associated with a particular container that is requesting access to a particular file and only load that particular file in memory. As an illustrative example, when a particular container (e.g., container A) having a particular application runtime workload pattern (e.g., workload pattern A that includes accessing file a in layer 7 at file address 0xaaa and file b in layer 8 at file address 0xbbb) is requesting access to a particular file (e.g., file a), the file system of the container image corresponding to that particular container reads the shared file system layer access information corresponding to that particular application runtime workload pattern and only loads the requested file (e.g., file a) into memory decreasing usage of memory space.

Thus, illustrative embodiments provide one or more technical solutions that overcome a technical problem with performance issues associated with current file systems corresponding to container images. As a result, these one or more technical solutions provide a technical effect and practical application in the field of container image file systems.

With reference now to FIG. 2, a diagram illustrating an example of a computer is depicted in accordance with an illustrative embodiment. Computer 201 may be implemented in computer 101 in FIG. 1. Computer 201 is a system of hardware and software components for enhancing performance of file systems in container images corresponding to containers running on computer 201.

In this example, computer 201 includes container management component 202, container A 204, and container image 206. Container management component 202 may be implemented in container management code 200 in FIG. 1. Container A 204 can represent any type of container that can run any type of containerized cloud application. In addition, container A 204 can represent a plurality of different containers on computer 201. Further, container A 204 corresponds to container image 206. Container image 206 includes file system 208. File system 208 is comprised of a plurality of layers. Each respective layer of the plurality of layers of file system 208 includes a set of files, each file having a file address.

At 210, container A 204 performs read and write operations on file a in layer 7 of file system 208 at file address 0xaaa and on file b in layer 8 of file system 208 at file address 0xbbb. Container management component 202 collects and records related to the operations as file system layer access information 212. In this example, file system layer access information 212 is "file a in layer 7, addr: 0xaaa" and "file b in layer 8, addr: 0xbbb". File system layer access information 212 can also include additional information, such as, for example, file size, file content when file size if less than the defined file size threshold level, and the like.

With reference now to FIG. 3, a diagram illustrating an example of an information sharing process is depicted in accordance with an illustrative embodiment. Information sharing process 300 is implemented in computer 302. Computer 302 may be, for example, computer 201 in FIG. 2.

In this example, computer 302 includes container management component 304, such as, for example, container management component 202 in FIG. 2. Computer 302 also includes container A 306 and container X 308. However, it should be noted that computer 302 may include any number of containers. In addition, in an alternative illustrative embodiment, container management component 304 may be located in a separate computer, such as, for example, a cloud server, and container X 308 may also be located on a different computer node.

Container A 306 corresponds to container image 310, which includes file system 312. At 314, container A 306 performs read and write operations on file a in layer 7 of file system 312 at file address 0xaaa and on file b in layer 8 of file system 312 at file address 0xbbb. Container management component 304 collects and records information related to the operations as file system layer access information 316. In this example, file system layer access information 316 is "file a in layer 7, addr: 0xaaa" and "file b in layer 8, addr: 0xbbb", which is similar to file system layer access information 212 in FIG. 2.

At step 1 318, container management component 304 saves file system layer access information 316 in container image repository 320. At step 2 322, container management component 304 shares file system layer access information 316 with file system 324 in container image 326. Container image 326 corresponds to container X 308. Moreover, container image 326 is a same container image as container image 310. As a result, when container X 308 requests access to either file a or file b, file system 324 can read shared file system layer access information 316 to acquire the file address of the requested file and load the requested file into memory for container X 308 to access and perform a read or write operation without having to search file system 324 layer-by-layer for the requested file. Thus, file access time is decreased (i.e., latency), along with time to start the operation on the requested file. Consequently, performance is increased.

Figure 4:
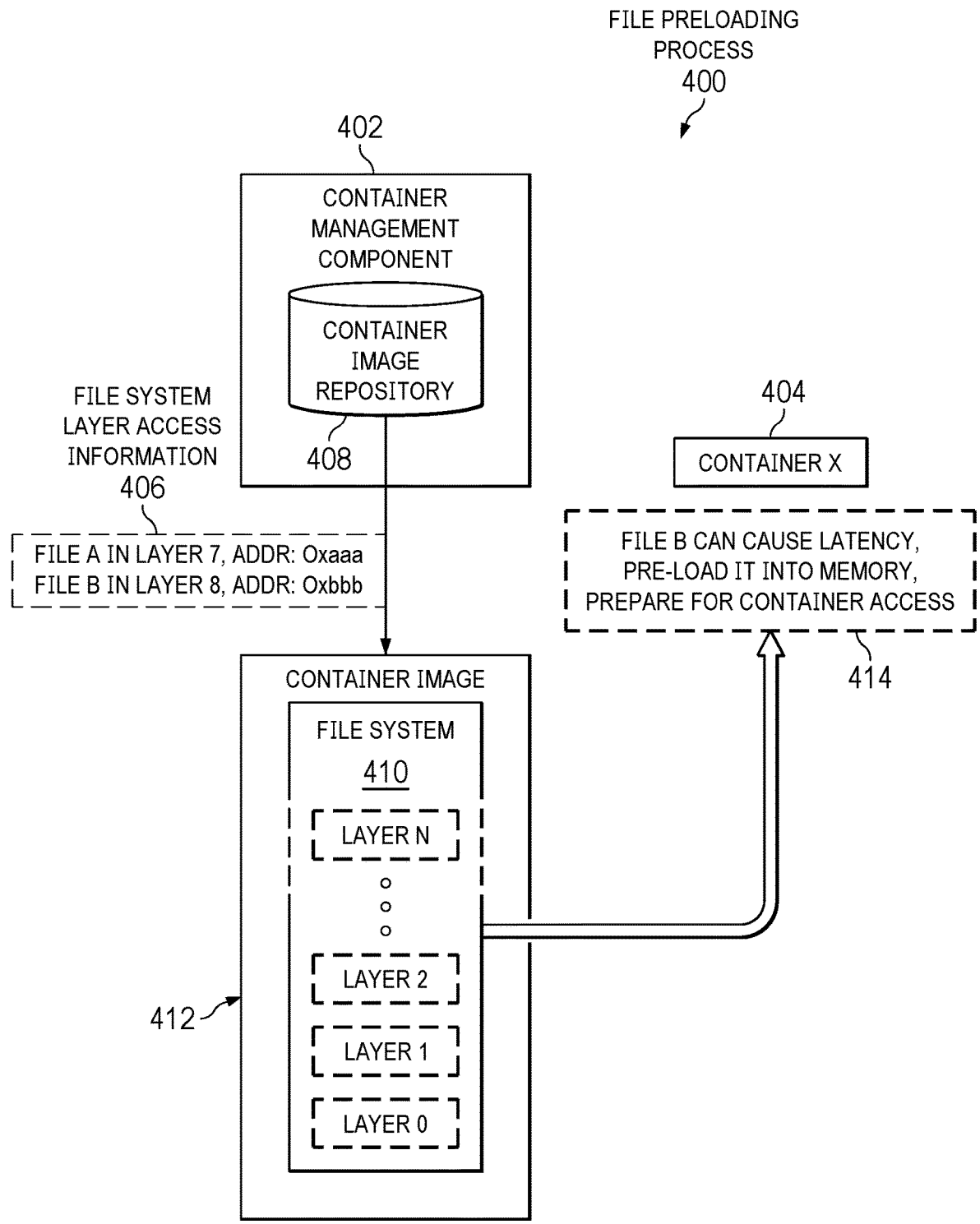
FIG. 4 is a diagram illustrating an example of a file preloading process in accordance with an illustrative embodiment.

With reference now to FIG. 4, a diagram illustrating an example of a file preloading process is depicted in accordance with an illustrative embodiment. File preloading process 400 can be implemented in a computer system, such as, for example, computer 101 in FIG. 1, computer 201 in FIG. 3, or computer 302 in FIG. 3.

In this example, file preloading process 400 includes container management component 402 and container X 404, such as, for example, container management component 304 and container X 308 in FIG. 3. Container management component 402 shares file system layer access information 406 (i.e., file a in layer 7, addr: 0xaaa and file b in layer 8, addr: 0xbbb), which is saved in container image repository 408, with file system 410. File system layer access information 406 is similar to file system layer access information 316 in FIG. 3. File system 410 is included in container image 412, which corresponds to container X 404.

In this example, container X 404 is requesting access to file b to perform an operation on file b. At 414, file system 410 analyzes shared file system layer access information 406 and determines that file b can cause latency because file system 410 ascertained that the size of file b is greater than or equal to the defined file size threshold level (i.e., file b is a large file). Therefore, file system 410 preloads file b into memory of the computer system in preparation for container X 404 to access when container X 404 starts. As a result, latency is avoided, and performance is improved.

Figure 5:
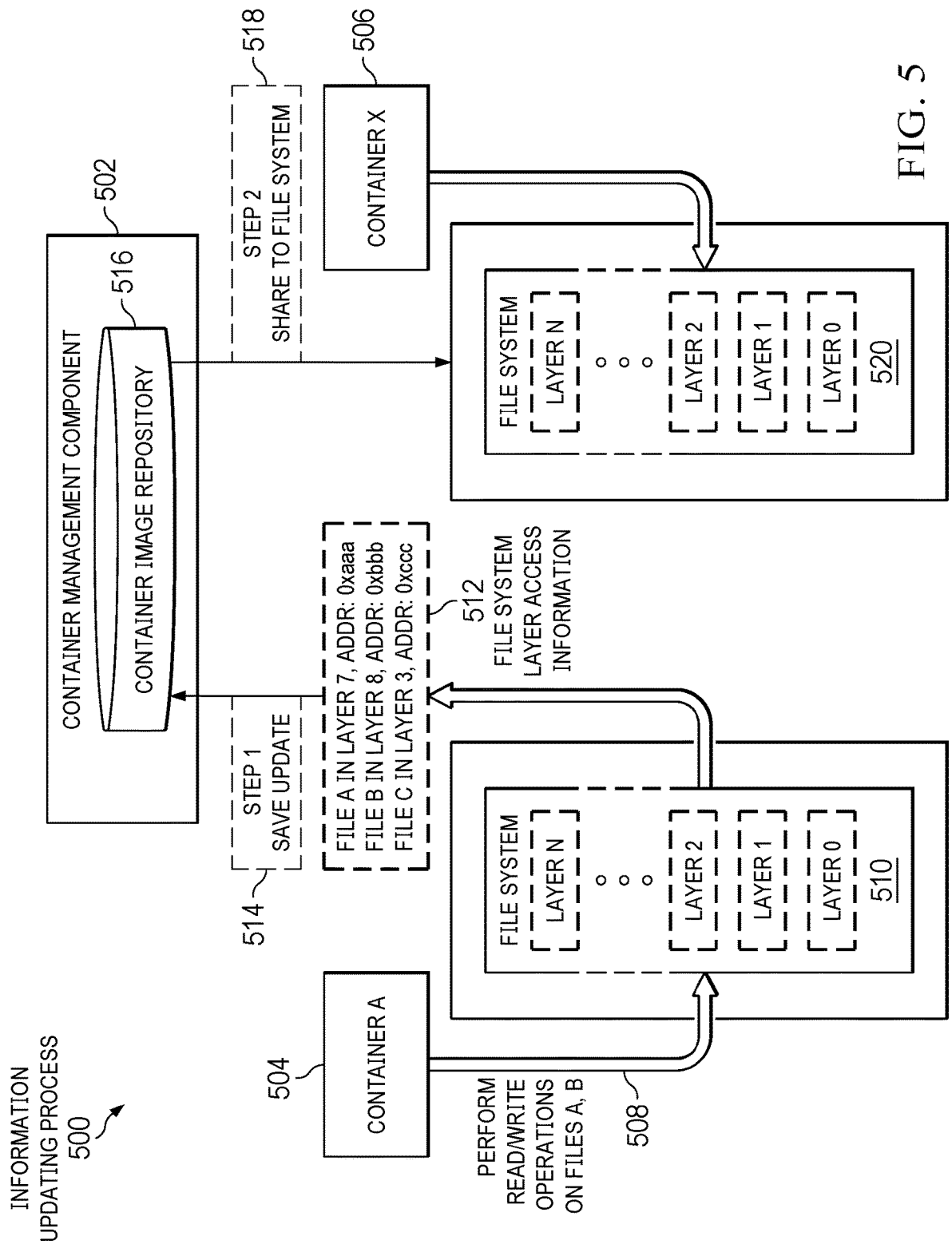
FIG. 5 is a diagram illustrating an example of an information updating process in accordance with an illustrative embodiment.

With reference now to FIG. 5, a diagram illustrating an example of an information updating process is depicted in accordance with an illustrative embodiment. Information updating process 500 can be implemented in a computer system, such as, for example, computer 101 in FIG. 1, computer 201 in FIG. 3, or computer 302 in FIG. 3.

In this example, information updating process 500 includes container management component 502, container A 504, and container X 506, such as, for example, container management component 304, container A 306, and container X 308 in FIG. 3. At 508, container A 504 performs read and write operations on file c in layer 3 of file system 510 at file address 0xccc. Container management component 502 collects and records information related to the operations in file system layer access information 512, which is similar to file system layer access information 316 in FIG. 3. However, in this example, file system layer access information 512 now includes "file c in layer 3, addr: 0xccc" in addition to "file a in layer 7, addr: 0xaaa" and "file b in layer 8, addr: 0xbbb", which container A 504 previously accessed to perform read and write operations.

At step 1 514, container management component 502 saves the update to file system layer access information 512 in container image repository 516. At step 2 518, container management component 502 shares updated file system layer access information 512 with file system 520 corresponding to container X 506.

Figure 6:
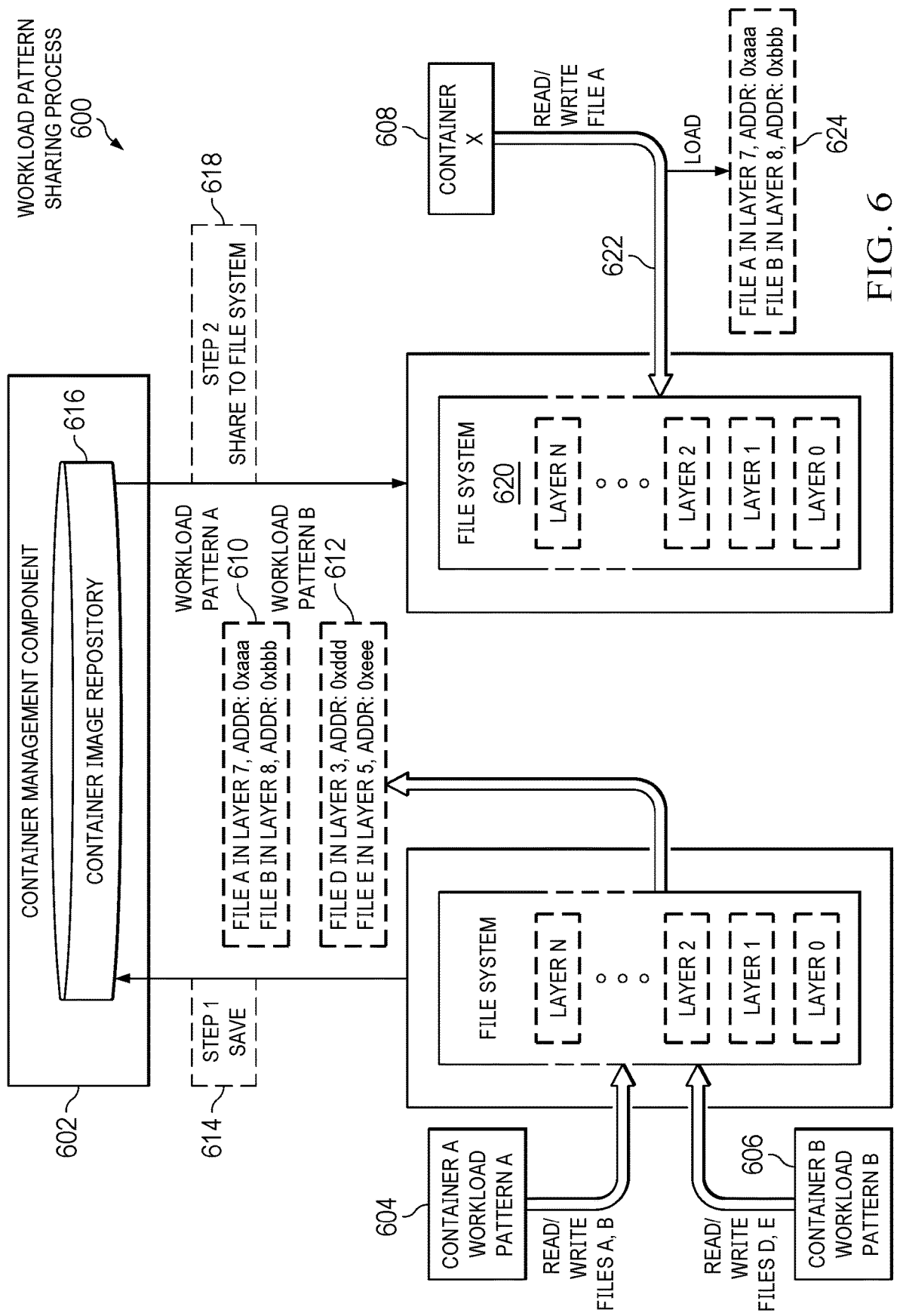
FIG. 6 is a diagram illustrating an example of a workload pattern sharing process in accordance with an illustrative embodiment.

With reference now to FIG. 6, a diagram illustrating an example of a workload pattern sharing process is depicted in accordance with an illustrative embodiment. Workload pattern sharing process 600 can be implemented in a computer system, such as, for example, computer 101 in FIG. 1, computer 201 in FIG. 3, or computer 302 in FIG. 3.

In this example, workload pattern sharing process 600 includes container management component 602, container A 604, container B 606, and container X 608. Also in this example, container A 604 is associated with workload pattern A 610 and container B 606 is associated with workload pattern B 612. A workload pattern is an application runtime pattern of operations performed by a particular container on different files in a file system of a corresponding container image. In this example, workload pattern A 610 is "file a in layer 7, addr: 0xaaa" and "file b in layer 8, addr: 0xbbb" and workload pattern B 612 is "file d in layer 3, addr: 0xddd" and "file e in layer 5, addr: 0xeee".

At step 1 614, container management component 602 saves workload pattern A 610 and workload pattern B 612 in container image repository 616. At step 2 618, container management component 602 shares workload pattern A 610 and workload pattern B 612 with file system 620, which corresponds to container X 608. At 622, container X 608 requests access to file a to perform read and write operations. Consequently, file system 620 reads shared workload pattern A 624, which is the same as workload pattern A 610, to identify the file address of file a and load file a in memory for container X 608 to access and perform the read and write operations. Because file system 620 was able to identify the file address (i.e., 0xaaa) in shared workload pattern A 624, file system 620 was able to locate file a without searching file system 620 layer-by-layer for file a, saving time and increasing performance.

Figure 7:
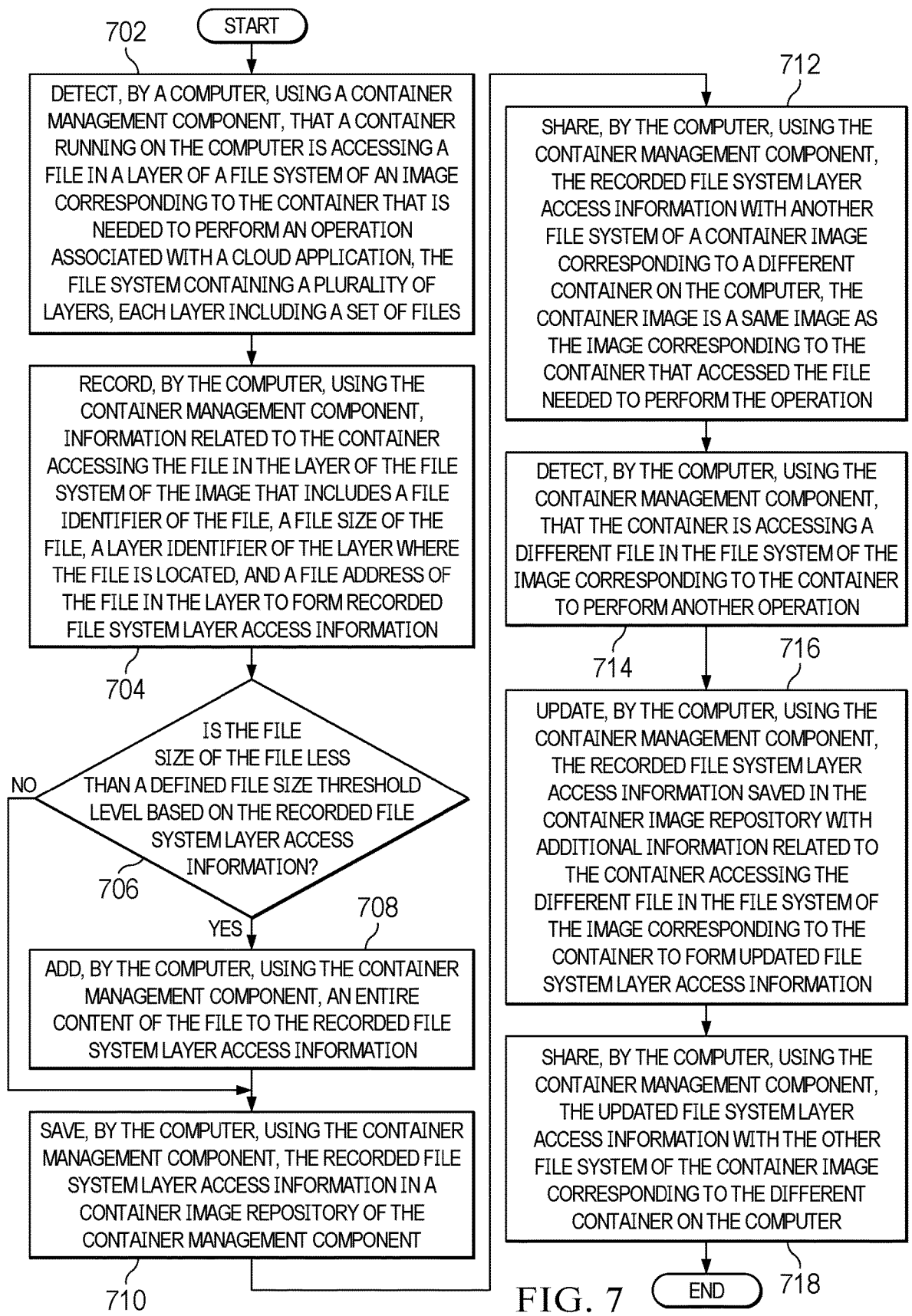
FIG. 7 is a flowchart illustrating a process for sharing layer access information in accordance with an illustrative embodiment.

With reference now to FIG. 7, a flowchart illustrating a process for sharing layer access information is shown in accordance with an illustrative embodiment. The process shown in FIG. 7 may be implemented in a computer, such as, for example, computer 101 in FIG. 1 or computer 201 in FIG. 2. For example, the process shown in FIG. 7 may be implemented in container management code 200 in FIG. 1 or container management component 202 in FIG. 1.

The process begins when the computer, using a container management component, detects that a container running on the computer is accessing a file in a layer of a file system of an image corresponding to the container (step 702). The container needs the file to perform an operation associated with a cloud application. The file system contains a plurality of layers, and each layer includes a set of files.

The computer, using the container management component, records information related to the container accessing the file in the layer of the file system of the image to form recorded file system layer access information (step 704). The information related to the container accessing the file includes a file identifier of the file, a file size of the file, a layer identifier of the layer where the file is located, and a file address of the file in the layer.

The computer, using the container management component, makes a determination as to whether the file size of the file is less than a defined file size threshold level based on the recorded file system layer access information (step 706). If the computer, using the container management component, determines that the file size of the file is less than the defined file size threshold level based on the recorded file system layer access information, yes output of step 706, then the computer, using the container management component, adds an entire content of the file to the recorded file system layer access information (step 708). Thereafter, the process proceeds to step 710. If the computer, using the container management component, determines that the file size of the file is not less than the defined file size threshold level based on the recorded file system layer access information, no output of step 706, then the computer, using the container management component, saves the recorded file system layer access information in a container image repository of the container management component (step 710).

The computer, using the container management component, shares the recorded file system layer access information with another file system of a container image corresponding to a different container on the computer (step 712). The container image is a same image as the image corresponding to the container that accessed the file needed to perform the operation.

Subsequently, the computer, using the container management component, detects that the container is accessing a different file in the file system of the image corresponding to the container to perform another operation (step 714). The computer, using the container management component, updates the recorded file system layer access information saved in the container image repository with additional information related to the container accessing the different file in the file system of the image corresponding to the container to form updated file system layer access information (step 716). Afterward, the computer, using the container management component, shares the updated file system layer access information with the other file system of the container image corresponding to the different container on the computer (step 718). Thereafter, the process terminates.

Figure 8:
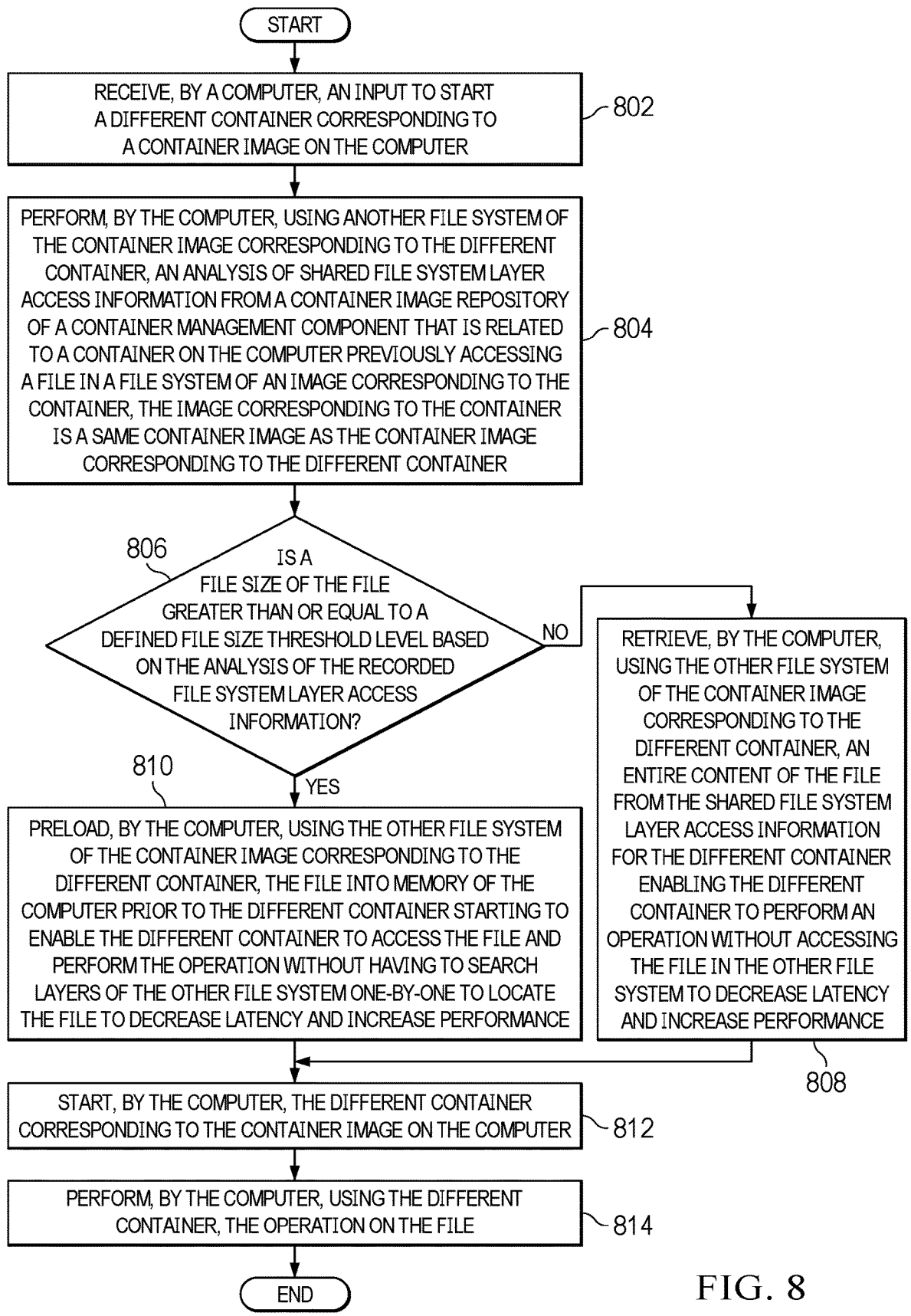
FIG. 8 is a flowchart illustrating a process for preloading files in accordance with an illustrative embodiment.

With reference now to FIG. 8, a flowchart illustrating a process for preloading files is shown in accordance with an illustrative embodiment. The process shown in FIG. 8 may be implemented in a computer, such as, for example, computer 101 in FIG. 1 or computer 201 in FIG. 2.

The process begins when the computer receives an input to start a different container corresponding to a container image on the computer (step 802). The computer, using another file system of the container image corresponding to the different container, performs an analysis of shared file system layer access information from a container image repository of a container management component (step 804). The shared file system layer access information is related to a container on the computer previously accessing a file in a file system of an image corresponding to the container. The image corresponding to the container is a same container image as the container image corresponding to the different container.

The computer, using the other file system of the container image corresponding to the different container, makes a determination as to whether a file size of the file is greater than or equal to a defined file size threshold level based on the analysis of the recorded file system layer access information (step 806). If the computer, using the other file system of the container image corresponding to the different container, determines that the file size of the file is not greater than or equal to the defined file size threshold level based on the analysis of the recorded file system layer access information, no output of step 806, then the computer, using the other file system of the container image corresponding to the different container, retrieves an entire content of the file from the shared file system layer access information for the different container enabling the different container to perform an operation without accessing the file in the other file system to decrease latency and increase performance (step 808). Alternatively, instead of retrieving the entire content of the file from the shared file system layer access information, the computer, using the other file system of the container image corresponding to the different container, can retrieve a file address of the file from the shared file system layer access information and load the file into memory for access by the different container. Thereafter, the process proceeds to step 812.

Returning again to step 806, if the computer, using the other file system of the container image corresponding to the different container, determines that the file size of the file is greater than or equal to the defined file size threshold level based on the analysis of the recorded file system layer access information, yes output of step 806, then the computer, using the other file system of the container image corresponding to the different container, preloads the file into memory of the computer prior to the different container starting to enable the different container to access the file and perform the operation without having to search layers of the other file system one-by-one to locate the file to decrease latency and increase performance (step 810).

Subsequently, the computer starts the different container corresponding to the container image on the computer (step 812). In addition, the computer, using the different container, performs the operation on the file (step 814). Thereafter, the process terminates.

Figure 9:
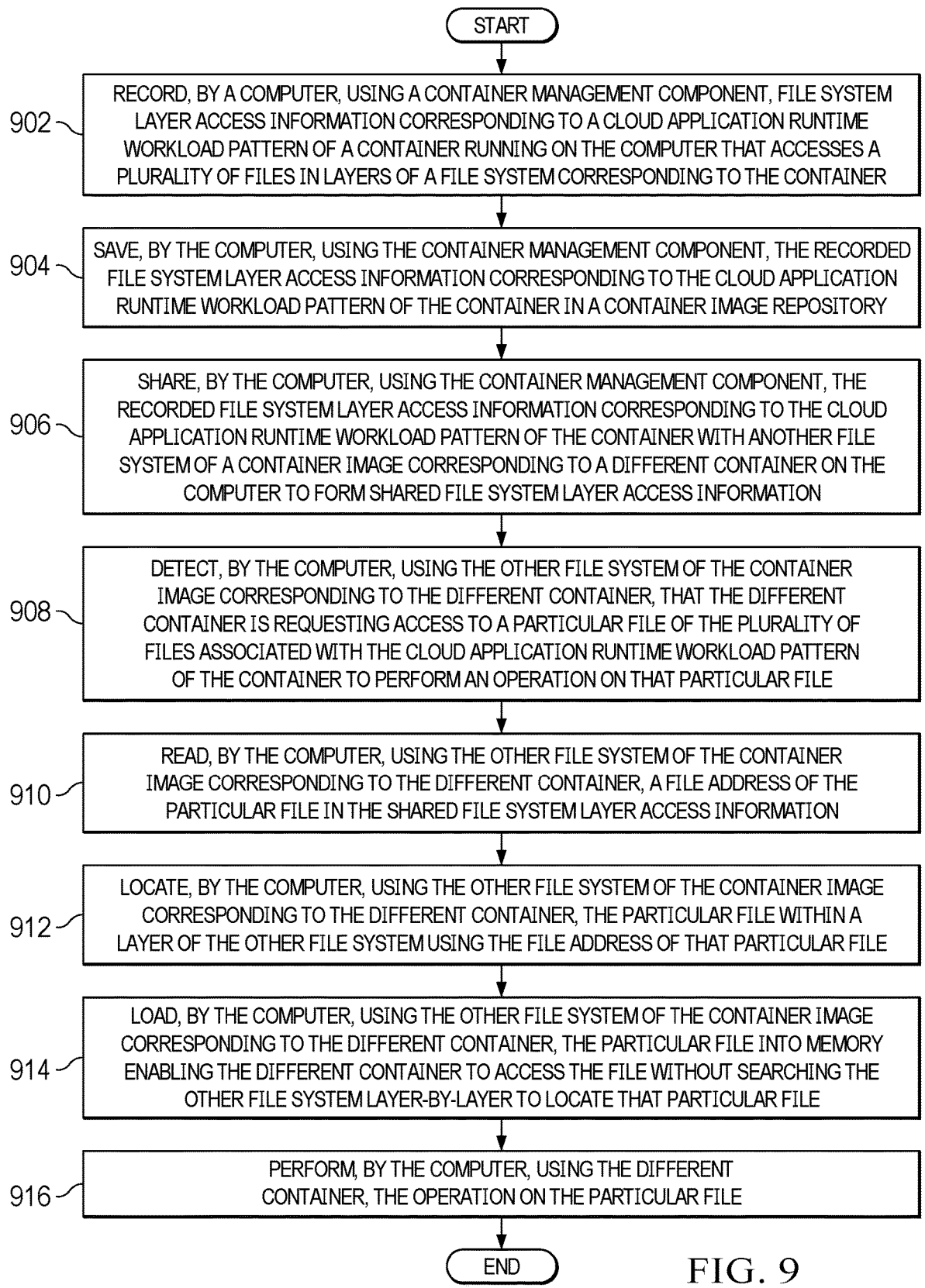
FIG. 9 is a flowchart illustrating a process for sharing runtime workload pattern information in accordance with an illustrative embodiment.

With reference now to FIG. 9, a flowchart illustrating a process for sharing runtime workload pattern information is shown in accordance with an illustrative embodiment. The process shown in FIG. 9 may be implemented in a computer, such as, for example, computer 101 in FIG. 1 or computer 201 in FIG. 2.

The process begins when the computer, using a container management component, records file system layer access information corresponding to a cloud application runtime workload pattern of a container running on the computer (step 902). The cloud application runtime workload pattern of the container accesses a plurality of files in layers of a file system corresponding to the container.

The computer, using the container management component, saves the recorded file system layer access information corresponding to the cloud application runtime workload pattern of the container in a container image repository of the container management component (step 904). In addition, the computer, using the container management component, shares the recorded file system layer access information corresponding to the cloud application runtime workload pattern of the container with another file system of a container image corresponding to a different container on the computer to form shared file system layer access information (step 906).

Subsequently, the computer, using the other file system of the container image corresponding to the different container, detects that the different container is requesting access to a particular file of the plurality of files associated with the cloud application runtime workload pattern of the container to perform an operation on that particular file (step 908). The computer, using the other file system of the container image corresponding to the different container, reads a file address of the particular file in the shared file system layer access information (step 910).

The computer, using the other file system of the container image corresponding to the different container, locates the particular file within a layer of the other file system using the file address of that particular file (step 912). The computer, using the other file system of the container image corresponding to the different container, loads the particular file into memory enabling the different container to access the file without searching the other file system layer-by-layer to locate that particular file (step 914). The computer, using the different container, performs the operation on the particular file (step 916). Thereafter, the process terminates.

Thus, illustrative embodiments of the present invention provide a computer-implemented method, computer system, and computer program product for enhancing performance of file systems in container images corresponding to containers running cloud applications on computers by sharing file system layer access information between file systems corresponding to a same container image. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for file system performance enhancement, the computer-implemented method comprising:
   recording, by a computer, information related to a container of the computer accessing a file in a layer of a file system of an image corresponding to the container to form recorded file system layer access information; and
   sharing, by the computer, the recorded file system layer access information with another file system of a container image corresponding to a different container on the computer, wherein the container image is the same image with same file system layers as the image corresponding to the container that accessed the file to perform an operation associated with a cloud application.

2. The computer-implemented method of claim 1, wherein the information related to the container accessing the file includes a file identifier of the file, a file size of the file, a layer identifier of the layer where the file is located, and a file address of the file in the layer.

3. The computer-implemented method of claim 1 further comprising:
   determining, by the computer, whether a file size of the file is less than a defined file size threshold level based on the recorded file system layer access information; and
   responsive to the computer determining that the file size of the file is less than the defined file size threshold level based on the recorded file system layer access information, adding, by the computer, content of the file to the recorded file system layer access information.

4. The computer-implemented method of claim 1 further comprising:
   detecting, by the computer, that the container is accessing the file in the layer of the file system of the image corresponding to the container, wherein the container needs the file to perform the operation associated with the cloud application, and wherein the file system contains a plurality of layers, each layer including a set of files.

5. The computer-implemented method of claim 1 further comprising:
   detecting, by the computer, that the container is accessing a different file in the file system of the image corresponding to the container to perform another operation;
   updating, by the computer, the recorded file system layer access information saved in a container image repository with additional information related to the container accessing the different file in the file system of the image corresponding to the container to form updated file system layer access information; and
   sharing, by the computer, the updated file system layer access information with the other file system of the container image corresponding to the different container on the computer.

6. The computer-implemented method of claim 1 further comprising:
   performing, by the computer, using the other file system of the container image corresponding to the different container, an analysis of shared file system layer access information, wherein the shared file system layer access information is related to the container on the computer previously accessing the file in the file system of the image corresponding to the container, the image corresponding to the container is a same container image as the container image corresponding to the different container; and
   determining, by the computer, using the other file system of the container image corresponding to the different container, whether a file size of the file is greater than or equal to a defined file size threshold level based on the analysis of the recorded file system layer access information.

7. The computer-implemented method of claim 6 further comprising:
   responsive to the computer, using the other file system of the container image corresponding to the different container, determining that the file size of the file is not greater than or equal to the defined file size threshold level based on the analysis of the recorded file system layer access information, retrieving, by the computer, using the other file system of the container image corresponding to the different container, an entire content of the file from the shared file system layer access information for the different container enabling the different container to perform an operation without accessing the file in the other file system to decrease latency and increase performance.

8. The computer-implemented method of claim 6 further comprising:
responsive to the computer, using the other file system of the container image corresponding to the different container, determining that the file size of the file is greater than or equal to the defined file size threshold level based on the analysis of the recorded file system layer access information, preloading, by the computer, using the other file system of the container image corresponding to the different container, the file into memory of the computer prior to the different container starting to enable the different container to access the file and perform an operation without having to search layers of the other file system one-by-one to locate the file to decrease latency and increase performance.

9. The computer-implemented method of claim 8 further comprising:
starting, by the computer, the different container corresponding to the container image on the computer; and
performing, by the computer, using the different container, the operation on the file.

10. The computer-implemented method of claim 1 further comprising:
recording, by the computer, file system layer access information corresponding to a cloud application runtime workload pattern of the container running on the computer, wherein the cloud application runtime workload pattern of the container accesses a plurality of files in layers of the file system corresponding to the container; and
sharing, by the computer, the file system layer access information corresponding to the cloud application runtime workload pattern of the container with the other file system of the container image corresponding to the different container on the computer to form shared file system layer access information.

11. The computer-implemented method of claim 10 further comprising:
detecting, by the computer, using the other file system of the container image corresponding to the different container, that the different container is requesting access to a particular file of the plurality of files associated with the cloud application runtime workload pattern of the container to perform an operation on that particular file;
reading, by the computer, using the other file system of the container image corresponding to the different container, a file address of the particular file in the shared file system layer access information;
locating, by the computer, using the other file system of the container image corresponding to the different container, the particular file within a layer of the other file system using the file address of that particular file;
loading, by the computer, using the other file system of the container image corresponding to the different container, the particular file into memory enabling the different container to access the file without searching the other file system layer-by-layer to locate that particular file; and
performing, by the computer, using the different container, the operation on the particular file.

12. A computer system for file system performance enhancement, the computer system comprising:
a communication fabric;
a storage device connected to the communication fabric, wherein the storage device stores program instructions; and
a processor connected to the communication fabric, wherein the processor executes the program instructions to:
record information related to a container of the computer system accessing a file in a layer of a file system of an image corresponding to the container to form recorded file system layer access information; and
share the recorded file system layer access information with another file system of a container image corresponding to a different container on the computer system, wherein the container image is the same image with same file system layers as the image corresponding to the container that accessed the file to perform an operation associated with a cloud application.

13. The computer system of claim 12, wherein the information related to the container accessing the file includes a file identifier of the file, a file size of the file, a layer identifier of the layer where the file is located, and a file address of the file in the layer.

14. The computer system of claim 12, wherein the processor further executes the program instructions to:
determine whether a file size of the file is less than a defined file size threshold level based on the recorded file system layer access information; and
add content of the file to the recorded file system layer access information in response to determining that the file size of the file is less than the defined file size threshold level based on the recorded file system layer access information.

15. The computer system of claim 12, wherein the processor further executes the program instructions to:
detect that the container is accessing the file in the layer of the file system of the image corresponding to the container, wherein the container needs the file to perform the operation associated with the cloud application, and wherein the file system contains a plurality of layers, each layer including a set of files.

16. A computer program product for file system performance enhancement, the computer program product comprising a computer-readable storage medium having program instructions embodied therewith, the program instructions executable by a computer to cause the computer to perform a method of:
recording, by the computer, information related to a container of the computer accessing a file in a layer of a file system of an image corresponding to the container to form recorded file system layer access information; and
sharing, by the computer, the recorded file system layer access information with another file system of a container image corresponding to a different container on the computer, wherein the container image is the same image with same file system layers as the image corresponding to the container that accessed the file to perform an operation associated with a cloud application.

17. The computer program product of claim 16, wherein the information related to the container accessing the file includes a file identifier of the file, a file size of the file, a layer identifier of the layer where the file is located, and a file address of the file in the layer.

18. The computer program product of claim 16 further comprising:

determining, by the computer, whether a file size of the file is less than a defined file size threshold level based on the recorded file system layer access information; and responsive to the computer determining that the file size of the file is less than the defined file size threshold level based on the recorded file system layer access information, adding, by the computer, content of the file to the recorded file system layer access information.

19. The computer program product of claim 16 further comprising:

detecting, by the computer, that the container is accessing the file in the layer of the file system of the image corresponding to the container, wherein the container needs the file to perform the operation associated with the cloud application, and wherein the file system contains a plurality of layers, each layer including a set of files.

20. The computer program product of claim 16 further comprising:

detecting, by the computer, that the container is accessing a different file in the file system of the image corresponding to the container to perform another operation;

updating, by the computer, the recorded file system layer access information saved in a container image repository with additional information related to the container accessing the different file in the file system of the image corresponding to the container to form updated file system layer access information; and sharing, by the computer, the updated file system layer access information with the other file system of the container image corresponding to the different container on the computer.

* * * * *